US012056981B2

(12) United States Patent
Huke et al.

(10) Patent No.: US 12,056,981 B2
(45) Date of Patent: Aug. 6, 2024

(54) METHOD OF PROVIDING A USER WITH BET-RELATED INFORMATION PRIOR TO PLACING A REAL-TIME BET

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/525,043

(22) Filed: Nov. 12, 2021

(65) Prior Publication Data

US 2022/0148369 A1 May 12, 2022

Related U.S. Application Data

(60) Provisional application No. 63/112,881, filed on Nov. 12, 2020.

(51) Int. Cl.
*G07F 17/32* (2006.01)
*G06Q 50/34* (2012.01)

(52) U.S. Cl.
CPC .......... *G07F 17/323* (2013.01); *G06Q 50/34* (2013.01); *G07F 17/3288* (2013.01)

(58) Field of Classification Search
CPC .............. G07F 17/3288; G07F 17/323; G07F 17/3244; G06Q 50/34; G06N 20/00
See application file for complete search history.

(56) References Cited

U.S. PATENT DOCUMENTS

| | | | | |
|---|---|---|---|---|
| 11,127,250 | B1 * | 9/2021 | Huke | G07F 17/3288 |
| 2002/0068633 | A1 * | 6/2002 | Schlaifer | G07F 17/3244 463/43 |
| 2012/0214575 | A1 * | 8/2012 | Amaitis | G06Q 50/34 463/25 |
| 2015/0262456 | A1 * | 9/2015 | Shore | G07F 17/3244 463/25 |
| 2015/0287278 | A1 * | 10/2015 | Shore | G07F 17/3248 463/29 |
| 2017/0039811 | A1 * | 2/2017 | Devaraj | G07F 17/326 |
| 2018/0330281 | A1 * | 11/2018 | Teller | G06N 20/00 |
| 2019/0197836 | A1 * | 6/2019 | Huke | G07F 17/3288 |
| 2019/0251794 | A1 * | 8/2019 | Simon | G06F 17/18 |
| 2019/0295382 | A1 * | 9/2019 | Huke | G07F 17/3209 |
| 2019/0392684 | A1 * | 12/2019 | McDonald | G06N 3/08 |
| 2020/0111325 | A1 * | 4/2020 | Lockton | G07F 17/3288 |
| 2020/0234543 | A1 * | 7/2020 | Schwartz | G07F 17/3279 |

* cited by examiner

*Primary Examiner* — Steve Rowland
(74) *Attorney, Agent, or Firm* — Maier & Maier, PLLC

(57) ABSTRACT

A method of providing usable data to a user of a play-by-play sports wagering network about the factors that may be impacting the odds in a currently open wagering market. Before betting, additional information about circumstances related to the current bet is provided to the user.

13 Claims, 2 Drawing Sheets

Figure 1:
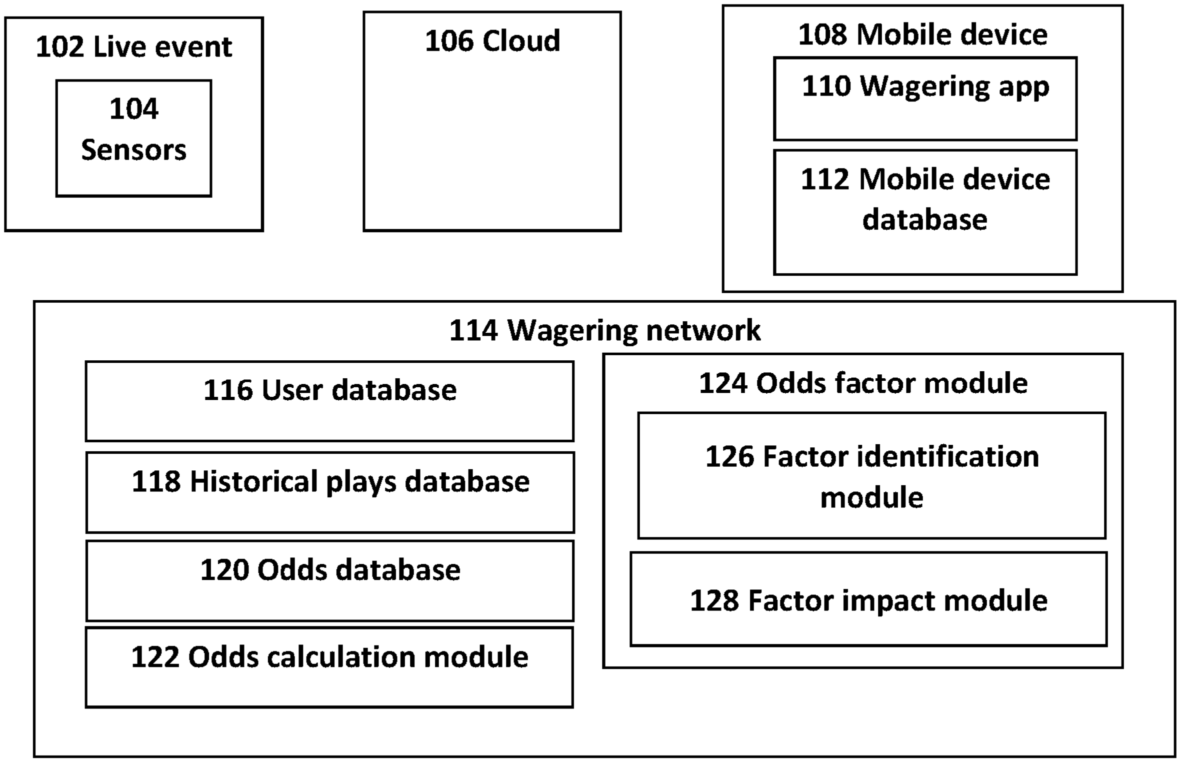

METHOD OF PROVIDING A USER WITH BET-RELATED INFORMATION PRIOR TO PLACING A REAL-TIME BET

FIELD

The present disclosures are generally related to play-by-play wagering on live sporting events.

BACKGROUND

Gamblers have often relied on their understanding of how contextual factors impact the expected outcome of a sporting event or sub-outcome of a sporting event as a way to decide what wagers to make. For example, a gambler may understand that as a pitcher gets tired, they have less control of their pitches and are more likely to walk a batter. However, it is difficult to identify all the contextual factors for a particular play as there are many types of plays in many different contexts of a game for which wagers may be placed on a play-by-play wagering network.

Also, in play-by-play wagering, a wagering market may be open for less than thirty seconds between plays. This short market window allows insufficient time to identify the context of the current wagering market and make comparisons to other historically similar situations.

Lastly, it is difficult to identify combinations of factors that may influence the outcome of a sporting event or sub-outcome of a sporting event.

SUMMARY

Methods, systems, and apparatuses for providing a user with bet-related information prior to placing a wager or bet. In one embodiment, a method for informing a user of characteristics of a live event that impact wager odds on a sports wagering network can include collecting real-time data from the live sporting event; receiving odds that are offered on at least one outcome of a current play in the live event based on the real-time data from a wagering device communicatively coupled to the wagering network; calculating expected odds of the at least one outcome of the current play using historical plays data; determining one or more characteristics of the live event that impact the odds being offered using the real-time data; comparing the offered odds and the expected odds to determine a level of discrepancy between the offered odds and the expected odds; and determining which one or more characteristics of the live event contribute to the level of discrepancy between the offered odds and the expected odds.

In another embodiment, a system for informing a user of characteristics of a live event that impact wager odds on a sports wagering network can include a live sporting event upon which play by play wagers can be placed; a current play in the live sporting event; real time data collected from the live sporting event; at least one wagering device; a play-by-play wagering network communicatively coupled to the at least one wagering device; an odds calculation module that calculates a first odds being offered on at least one outcome of the current play in the live event using historical plays data, and calculates second odds being offered based on the real-time data; an odds factor identification module that determines characteristics of the live event that impact the second odds being offered using the real-time data and compares the second odds and the first odds to determine a level of discrepancy between the second odds and the first odds; and a factor impact module that determines which characteristics of the live event contribute to the level of discrepancy between the second odds and the first odds.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a system for providing a user with bet-related information prior to placing a real-time bet, according to an embodiment.

Figure 2:
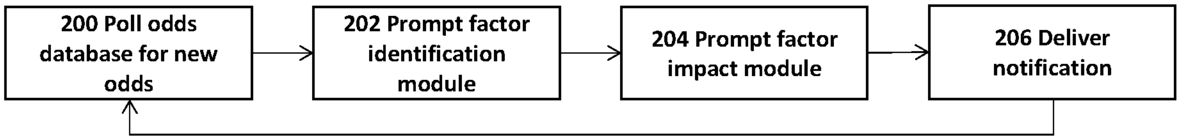

FIG. 2: illustrates an odds factor module, according to an embodiment.

Figure 3:
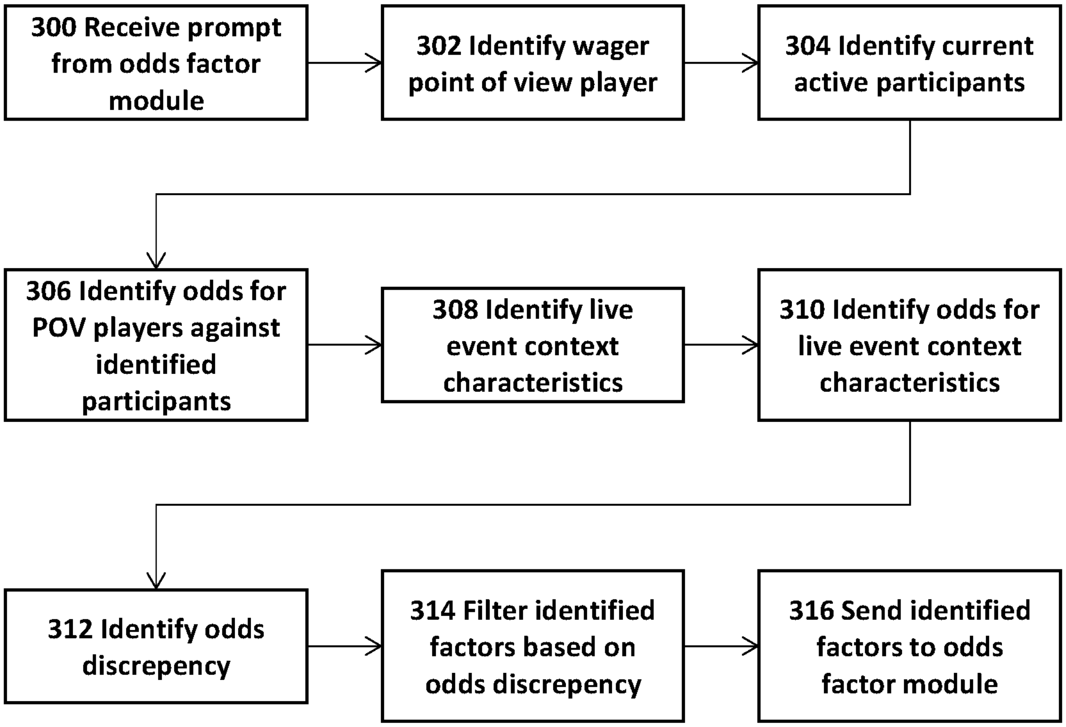

FIG. 3: illustrates a factor identification module, according to an embodiment.

Figure 4:
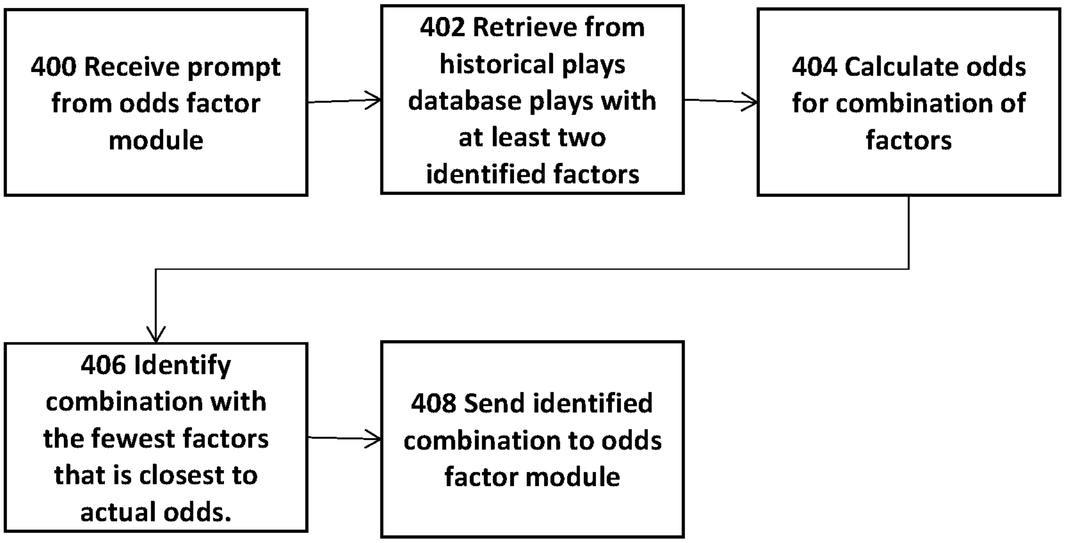

FIG. 4: illustrates a factor impact module, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or other type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain to place bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread," a "money-line" bet. "Money line," "straight bet," and "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread." A handicap of the "point spread" value is given to the favorite team so bettors can choose sides at equal odds. "Cover the spread" means that a favorite wins an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick 'em" refers to a game when neither team is favored in an event or game. "Line," "cover the spread," "cover," "tie," "pick," and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if they win all the wagers in the "parlay," the player receives a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay," "round robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers scheduled to start a game start. If they do not, the bet is deemed "no action" and refunded. The "run line" in baseball refers to a spread used instead of the money line. "Listed pitchers," "no action," and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle," "juice," vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individuals that would deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management service are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are services that help customers with (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat players to free bets, odds boosts, enhanced access, and flexible cash-back to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by always managing commission and availability. The "cash out" or "pay out" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth by creating and delivering actionable insights on performance to help customers to manage the sports gaming. Business Applications can be integrated into the embodiments in a variety of manners.

State-based integration allows for a given sports gambling game to be modified by states in the United States or other countries, based upon the state the player is in, mobile phone, or other geolocation identification means. State-based integration can be integrated into the embodiments in a variety of manners.

Game Configurator allows for configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds with a known recorded work. A database may contain metadata about the work and associated information, including complementary media. If the media clip's fingerprint is matched, the identification software returns the corresponding metadata to the client application. For example, during an in-play sports game, a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such item or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for providing a user with bet-related information prior to placing a real-time bet. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 114 can offer several SaaS managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include but is not limited to, a plurality of betting attributes such as at least one of the following: the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120—that may contain the odds calculated by an odds calculation module 122—to display the odds on the user's mobile device 108 and take bets from the user through the mobile device wagering app 110.

Further, embodiments may include the odds calculation module 122, which may utilize historical play data to calculate odds for in-play wagers.

Further, embodiments may include an odds factor module 124, which may communicate to the user contextual factors for a given wagering market that may impact the odds. For example, when the new odds are available in the odds database 120, the odds factor module 124 may call a factor identification module 126 to identify contextual characteristics that impact the odds. Then a factor impact module 128 may be called to determine the relative impact of each identified factor on the odds for a given wagering market.

Further, embodiments may include the factor identification module 126, which may identify one or more context characteristics of the live event 102 that may impact the odds for a given wagering market. For example, the odds of a baseball player with a 0.300 batting average getting a hit in a given at-bat may be expected to +235. +235 is the money line equivalent of a 30% chance. However, the odds being offered by the wagering network 114 of the batter getting a hit in the current at-bat are +300, which corresponds to a 25% chance of an event happening. The factor identification module 126 may identify characteristics, or combinations of characteristics, of the current wagering market that may be contributing to the discrepancy in the expected odds and the actual odds. These factors may include the players involved, a comparison against a league average or replacement player, similar to a wins above replacement (WAR) statistic, the weather, the location of the live event 102, the score, the position of other participants in the live event 102, recent trends in performance, etc.

Further, embodiments may include the factor impact module 128, which may identify the magnitude of impact a given contextuaul characteristic may have on the odds in the current wagering market. For example, the odds of a baseball player with a 0.300 batting average getting a hit in a given at-bat may be expected to +235. +235 is the money line equivalent of a 30% chance. The odds being offered by the wagering network 114 of the batter getting a hit in the current at-bat are +300, which corresponds to a 25% chance of an event. Potential contextual characteristics of the live event 102 that may factor into the current odds may include the position of another participant, such as a runner on second base, the weather, such as light rain, and the location of the game, a home game. The factor impact module 128 may determine that having a runner on second base may increase the odds of a walk, thus lowering the odds of a hit. It may also identify that having light rain may correspond to a 10% increase in the pitcher's walk rate. The relative impact of one or more factors may then be communicated to the user.

FIG. 2 illustrates the odds factor module 124. The process may begin with the odds factor module 124 polling, at step 200, the odds database 120 for odds available on an open wagering market. For example, when a batter comes up to bat, the odds calculation module 122 may have a wagering market on the batter getting a hit and offer odds of +400 on that outcome. The odds factor module 124 may prompt, at step 202, the factor identification module 126. The factor identification module 126 may return contextual characteristics of the live event 102 that may be factored in the odds. The odds factor module 124 may prompt, at step 204, the factor impact module 128. The factor impact module 128 may return a weighted list of factors that may impact the odds. A notification related to some or all the weighted list of factors may be delivered at step 206 to one or more users connected to the wagering network 114. For example, the odds being offered for Aaron Judge to get a hit in his current at-bat against Clayton Kershaw may be +400. If Aaron Judge has a 0.300 batting average, meaning he gets a hit 30% of the time, the odds offered of him getting a hit may be +230. The factor identification module 126 may identify several characteristics of the live event 102 that may be factored in the probability of Aaron Judge getting a hit in this at-bat being +400, representing an outcome having a 20% probability. The identified factors may be the pitcher being left-handed, runners on second and third base, one out in the inning, and the weather, including light precipitation. The factor impact module 128 may identify the position of the runners on base and the number of outs in the inning as the largest contributors to the decrease in the probability of Aaron Judge getting a hit in the current at-bat. In this example, these contextual characteristics may impact the odds because the odds of a walk increase due to a commonly known baseball strategy to walk a batter in these circumstances and set up a double play. Additionally, or as an alternative, the impact on the odds may be compared to an replacement level player, in a similar manner that the "Wins Above Replacment (WAR)" is calculated The notification to the user may be in many forms. In one example, the user may be viewing the multiple available wagers on the current at-bat. The notification may highlight the "hit" wagering market with a red box or arrow, while the "walk" wagering market may be highlighted with a green box or arrow. The notification may demonstrate that the increased odds of a walk are suppressing the odds of getting a hit. The notification may include one or more factors not represented in a wagering market in another exemplary embodiment. For example, the sensors 104 may collect data related to the pitches being thrown, such as spin rate, vertical break, horizontal break, release point, etc. Characteristics provided by a third party or sensors may include information such as weather data, scouting reports, batting order, injury reports, etc. Notifications related to factors that are not wagering markets may be represented to the user as a pop-up, banner, ticker, or other added content. The notification may be a graphical representation of the factor. For example, rain falling may be shown to be depressing the odds of the batter getting a hit. Representations of performance data, such as a pitcher's spin rate or release point, may be represented on the wagering screen. For example, the sensor data may indicate the pitcher's release point has been more inconsistent in the current live event 102 than in the plays retrieved from the historical plays database 118. This information may be delivered to the user by illustrating a circle around the range of release points in the current live event 102, overlayed with a smaller circle representing the historical range of the pitcher's release points. Inconsistency in a pitcher's release point is often highly correlated with a decrease in the pitcher's command of his pitches, which may increase the probability of a walk. A pitcher's average spin rate in the current live event 102 may be higher than normal, which may also decrease the probability of the batter getting a hit. A higher spin rate on a given pitch type is often highly correlated with more swing-and-miss strikes and weaker contact, as indicated by diminished exit velocities. A rotating baseball may be depicted with the variance between the pitcher's historical average spin rates and their spin rates in the current live event 102. Any number of factors may be included in a notification. For example, the user may be shown that the open base at first increases the odds of a walk, and the increased spin rate decreases the odds of a hit, and the increased variation in release the pitcher's release point also increases the odds of a walk and diminishes the odds of a hit. In another embodiment, the relative impact of multiple factors on the probability of an outcome in the current wagering market may be included in the notification. For example, if three factors identified as impacting the odds of the current wagering market were the pitcher's increased spin rate, the pitcher's decrease in the consistency of his release point, and the position of the runners on base, it may be determined that the position of the runners account for 80% of the decrease in the odds for a hit, while the pitcher's release point inconsistency accounts for 15% of the decrease in odds, and the pitcher's increase in spin rate accounts for 5% of the decrease in the odds. The relative impact of these factors may be represented as alphanumeric. The relative impact may also be represented by the relative size, magnitude, intensity, or motion, of each visual representation of the factor. For example, the factor with the most impact on the odds change may be listed first in a list or proportionally larger than the other text or image. The process may then return to step 200.

FIG. 3 illustrates the factor identification module 126. The process may begin with the factor identification module 126 receiving, at step 300, a prompt from the odds factor module 124 indicating there are odds available on a currently open wagering market for a sub-outcome of the live event 102. For example, there may be odds of +400 available to wager on Aaron Judge getting a hit in the current at-bat of the live event 102. A sub-outcome may be any play, portion of a play, or combination of plays in the live event 102 that are not the conclusion of the live event 102. For example, a pitch, at-bat, or inning, a baseball game, a play, drive, quarter, or half in an American football game. The factor identification module 126 may identify, at step 302, the point-of-view player for the currently open wagering market. The point-of-view player may be the player on whom the user has wagered. For example, if the user wagered Aaron Judge to get a hit in his current at-bat, Aaron Judge may be the point-of-view player for that wagering market. Some sub-outcomes may have more than one potential point-of-view player. For example, a user could wager on a strikeout in the current at-bat. The point-of-view player may be batter, as in "I bet that Aaron Judge strikes out." The point-of-view player may also be the pitcher, as in "I bet Clayton Kershaw strikes Aaron Judge out." For cases in which there may be multiple potential point-of-view players, the point-of-view player may be identified by the phrasing of the wager. The point-of-view player may also be personalized to the user based on their preferences, wagering history, or other characteristics. For example, a Dodgers fan or a user geolocated in Los Angeles may have the pitcher assigned as the point-of-view player in their wagering app 110 and because the pitcher is on the Los Angeles Dodgers the system may assume their preference of team. The factor identification module 126 may identify, at step 304, current active participants in the live event 102 that are not the point-of-view players for the currently open wagering market. Suppose the point-of-view player is the batter. Participants in the live event 102 that are not the point-of-view player may include the pitcher, defenders, runners on base, potential relief pitchers, potential pinch hitters, managers, coaches, officials, etc. The factor identification module 126 may identify, at step 306, the odds for the point-of-view player identified against other participants that may be identified. For example, the odds of the batter getting a hit off of the current pitcher or a cohort of similar pitchers may be calculated. The odds of the batter, or a cohort of similar batters, getting a hit with runners on second and third and one out may be calculated. This process of calculating odds may be repeated for any other active participants or a combination of active participants. The factor identification module 126 may identify, at step 308, contextual characteristics of the live event 102. Contextual characteristics of the live event 102 may include the location, weather, score, league standings, playoff standings, playoff position, player biometrics, player averages versus those of an average or replacement player, etc. The factor identification module 126 may identify, at step 310, odds for the contextual characteristics of the live event 102. For example, the odds may be determined for the batter, who is the point-of-view player, getting a hit in similar weather in the current ballpark, during a similar period, against a specific defensive alignment, the same officials, etc. It should be obvious that the odds of a given outcome may be calculated involving a combination of these factors and the other active participants in the live event 102. The factor identification module 126 may identify, at step 312, any discrepancy between the odds on an outcome in the odds database 120 and the odds of the point-of-view player having that same outcome in the absence of any context characteristic or participant-based factors. For example, Aaron Judge may get a hit in 30% of his plate appearances when considering the entire season. The odds being offered may reflect only a 20% chance of Aaron Judge getting a hit in the current context of the live event 102. The difference between the 30% expected odds and the 20% offered odds represents the discrepancy of −10%. The factor identification module 126 may filter, at step 314, the identified factors to include the factors that may have the same directional impact on the odds. For example, Aaron Judge may have a lower chance of getting a hit with a runner on second base and first base open than some larger sample size of his at-bats. Other factors that may harm the odds of Aaron Judge getting a hit in the current at-bat may include increased spin rate by the pitcher, a larger or more inconsistent strike zone being called by the current umpire, first base being open with a runner in scoring position and less than two outs, a right-handed pitcher pitching, weather that impacts the pitcher's command of their pitches, a defensive shift, etc. Factors that may positively impact the odds of Aaron Judge getting a hit may include decreased spin rate by the pitcher, the bases being loaded, a left-handed pitcher pitching, etc. Factors that have the opposite impact of the identified discrepancy may be discarded. The factor identification module 126 may send, at step 316, the remaining identified factors that have the same directional impact on the odds as the identified discrepancy to the odds factor module 124.

FIG. 4 illustrates the factor impact module 128. The process may begin with the factor impact module 128 receiving, at step 400, a prompt from the odds factor module 124 that may include at least one factor that may be influencing the odds on a currently open wagering market. For example, the odds being offered for Aaron Judge to get a hit in his current at-bat against Clayton Kershaw may be +400. If Aaron Judge has a 0.300 batting average, meaning he gets a hit 30% of the time, the odds offered for him getting a hit may be +230. The factor identification module 126 may identify several characteristics of the live event 102 that may be factored in the probability of Aaron Judge getting a hit in this at-bat being +400, representing an outcome having a 20% probability. The identified factors may be the pitcher being left-handed, the pitcher's spin rate being 100 rpm higher than his average, runners being on second base and third base, the number of outs in the inning being one, the batter's or pitcher's situational statistics and comparison against a replacement or average player, and the weather including light precipitation. The factor identification module 126 may identify the position of the runners on base and the number of outs in the inning, the light precipitation, and the increase in the pitcher's average spin rate as the factors that contribute to the decrease in the probability of Aaron Judge getting a hit in the current at-bat. The factor impact module 128 may retrieve, at step 402, historical plays involving the current point-of-view player, or a cohort of similar players, and at least two of the identified factors from the historical plays database 118. For example, plays with Aaron Judge batting with first base open, one out, and light rain. The factor impact module 128 may calculate, at step 404, the odds of the outcome that is the subject of the currently open wagering market occurring in the retrieved plays. The factor impact module 128 may identify, at step 406, a combination of the fewest factors that are closest to the actual odds. For example, the odds of Aaron Judge getting a walk when there is one out and a runner on second might be 8% higher at 18% than his overall walk rate of 10%. If the discrepancy between the expected odds of Aaron Judge getting a hit in the current context (20%) and the odds of him getting a hit in a randomly selected at-bat (30%), then the 8% increase in the probability of a walk may represent 80% of the 10% discrepancy of the odds on a hit. This calculation may assume that the increased odds for a walk came entirely from a decline in hits. Suppose the 8% increase in the probability of a walk came half fewer expected hits and a half from fewer expected outs. This calculation may be consistent with the increased likelihood that a pitcher will pitch around or intentionally walk a batter to set up a double play when there is a runner on second with less than two outs and first base is open. In that case, at least one additional factor may be necessary to account for at least 80% of the discrepancy. It should be noted that 80% is the threshold chosen for an example of a threshold that would indicate the preponderance of the odds discrepancy due to the identified factors. That threshold could be higher or lower depending upon the capacity of the system. An algorithm may dynamically determine it. The factors may continue to be combined until the combination with the fewest factors that can account for at least 80% of the odds discrepancy can be identified. It should be obvious that it may not be possible to calculate odds for all possible combinations in the time when a wagering market is open. A maximum number of possible factors to combine, total attempts, etc., may be used as a cutoff to ensure information is delivered in a timely fashion. Once at least one factor has been identified as potentially responsible for at least 80% of the discrepancy between the expected odds of an outcome and the observed odds of an outcome, the factor impact module 128 may send, at step 408, the identified factor, or combination of factors, to the odds factor module 124.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for informing a user of characteristics of a live event that impact wager odds on a network, comprising:

automated collecting of real-time data from the live event using a variety of sensors, wherein the collected data is related to actions inside of the live event or actions performed by participants of the live event on which wagers can be made;

receiving odds, before termination of a current play or action, that are offered on at least one outcome of an upcoming play or action in the live event based on the real-time data from a wagering device communicatively coupled to and configured to automatically query the network;

automatically calculating, based upon real-time analysis, expected odds of the at least one outcome of the upcoming play or action using historical play data;

determining one or more characteristics of the live event that impact the odds being offered using the real-time data;

comparing the offered odds and the expected odds to determine a level of discrepancy between the offered odds and the expected odds; and determining, at a termination of the current play or action, that at least one characteristic of the live event contributed to the level of discrepancy between the offered odds and the expected odds; and notifying the user of the at least one characteristic that contributed to the level of discrepancy between the offered odds and the expected odds of the upcoming play or action.

2. The method for informing the user of characteristics of the live event that impact wager odds on the network of claim 1, further comprising:

notifying the user of the level of discrepancy contributed by the at least one characteristic that contributed to the level of discrepancy between the offered odds and the expected odds.

3. The method for informing the user of characteristics of the live event that impact wager odds on the network of claim 1, further comprising:

determining which combination of characteristics account for a preponderance of the discrepancy between the offered odds and the expected odds.

4. The method for informing the user of characteristics of the live event that impact wager odds on the network of claim 1, wherein the characteristics of the live event that impact the odds being offered are the participants in the current play.

5. The method for informing the user of characteristics of the live event that impact wager odds on the network of claim 1, wherein the characteristics include a situational comparison to a replacement level player.

6. The method for informing the user of characteristics of the live event that impact wager odds on the network of claim 1, further comprising:

determining a lowest number of characteristics that make up at least a predetermined amount of the discrepancy between the offered odds and the expected odds.

7. The method for informing the user of characteristics of the live event that impact wager odds on the network of claim 1, wherein the real time data from the live event is collected by at least one sensor.

8. A system comprising;

at least one device;

a network communicatively coupled to the at least one device;

an odds calculation module that is configured to:

calculate, based upon real-time analysis, first odds to be offered on at least one outcome of an upcoming play or action in a live event using historical play data before termination of a current play or action, and calculate second odds being offered based on the real-time data;

an odds factor identification module that is configured to:

determine characteristics of the live event that impact the second odds being offered using the real-time data; and compare the second odds and the first odds to determine a level of discrepancy between the second odds and the first odds;

a factor impact module that is configured to determine that at least one characteristic of the live event contributed to the level of discrepancy between the second odds and the first odds; and an odds factor module that is configured to send a notification to the at least one device of the at least one characteristic that contributed to the level of discrepancy between the second odds and the first odds.

9. The system of claim 8, wherein the odds factor module is further configured to notify the user of the level of discrepancy contributed by the at least one of the characteristics that are contributing to the level of discrepancy between the second odds and the first odds.

10. The system of claim 8, wherein the factor impact module is further configured to determine which combination of characteristics account for the preponderance of the discrepancy between the second odds and the first odds.

11. The system of claim 8, wherein the characteristics of the live event that impact the second odds are the participants in the current play.

12. The system of claim 8, wherein the factor impact module is further configured to determine the fewest number of characteristics that make up at least a predetermined amount of the discrepancy between the second odds and the first odds.

13. The system of claim 8, wherein the real time data of the live event is collected by one or more sensors.

* * * * *